United States Patent
Bailey et al.

(10) Patent No.: US 12,303,994 B2
(45) Date of Patent: May 20, 2025

(54) FRICTION STIR ADDITIVE MANUFACTURING FORMED PARTS AND STRUCTURES WITH INTEGRATED PASSAGES

(71) Applicant: Blue Origin Manufacturing, LLC, Huntsville, AL (US)

(72) Inventors: Michael L. Bailey, Montgomery, TX (US); Weidong Song, Woodinville, WA (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/365,125

(22) Filed: Aug. 3, 2023

(65) Prior Publication Data

US 2025/0041964 A1    Feb. 6, 2025

(51) Int. Cl.
*B23K 20/00*        (2006.01)
*B23K 20/12*        (2006.01)
(Continued)

(52) U.S. Cl.
CPC ...... *B23K 20/1215* (2013.01); *B23K 20/1255* (2013.01); *B23K 20/128* (2013.01);
(Continued)

(58) Field of Classification Search
CPC .............. B23K 20/1255; B23K 20/125; B23K 20/122; B23K 20/128; B33Y 10/00; B33Y 30/00
See application file for complete search history.

(56) References Cited

U.S. PATENT DOCUMENTS 3,069,847 A    12/1962    Vest, Jr.
3,585,800 A    6/1971    Kuntz
(Continued)

FOREIGN PATENT DOCUMENTS

AU      2014274824 A1    12/2015
AU      2018359514 B2    10/2018
(Continued)

OTHER PUBLICATIONS

Wagner, J et al. "Method for Fabricating Metallic Panels with Deep Stiffener Sections" https://www.techbriefs.com/component/content/article/23860-lar-17976-1, Feb. 1, 2016, 5 pages.
(Continued)

*Primary Examiner* — Erin B Saad
(74) *Attorney, Agent, or Firm* — Knobbe, Martens, Olson & Bear, LLP (57) ABSTRACT

A method of additive manufacturing a structure having integrated passages is provided. In one aspect, the method includes forming first and second parts, each part having a near net shape. The first and second parts are formed by moving a friction stir tool configured to deposit a filler material. An inner surface of each part can be machined to form a generally smooth surface. The first and the second parts are joined to form a structure. The structure is machined to form a generally smooth outer surface. The method includes machining a plurality of grooves extending into the generally smooth outer surface of the structure. A tube is placed into each of the plurality of grooves and a layer of material is deposited to secure the tubes within the plurality of grooves. The method can include machining the outer surface to a predetermined shape.

20 Claims, 6 Drawing Sheets

(51) Int. Cl.
  *B33Y 10/00*   (2015.01)
  *B33Y 80/00*   (2015.01)
  *B23K 103/10*   (2006.01)

(52) U.S. Cl.
  CPC ............ *B23K 20/129* (2013.01); *B33Y 10/00* (2014.12); *B33Y 80/00* (2014.12); *B23K 2103/10* (2018.08)

(56) References Cited

U.S. PATENT DOCUMENTS

| | | | |
|---|---|---|---|
| 3,737,976 | A | 6/1973 | Lieberman et al. |
| 4,364,067 | A | 12/1982 | Koto et al. |
| 5,233,755 | A | 8/1993 | Vandendriessche |
| 5,697,511 | A | 12/1997 | Bampton |
| 5,971,252 | A | 10/1999 | Rosen et al. |
| 6,050,474 | A | 4/2000 | Aota et al. |
| 6,151,887 | A | 11/2000 | Hadin |
| 6,536,651 | B2 | 3/2003 | Ezumi et al. |
| 6,543,671 | B2 | 4/2003 | Hatten et al. |
| 6,606,851 | B1 | 8/2003 | Herdy, Jr |
| 6,669,075 | B2 | 12/2003 | Colligan |
| 6,779,707 | B2 | 8/2004 | Dracup et al. |
| 7,090,112 | B2 | 8/2006 | Masingale |
| 7,093,470 | B2 | 8/2006 | El-Soudani |
| 7,097,091 | B2 | 8/2006 | Okamura et al. |
| 7,128,532 | B2 | 10/2006 | Petervary |
| 7,354,657 | B2 | 4/2008 | Mishra |
| 7,430,888 | B2 | 10/2008 | Osame |
| 7,556,187 | B2 | 7/2009 | Sunahara et al. |
| 7,735,223 | B2 | 6/2010 | Clark |
| 7,854,958 | B2 | 12/2010 | Kramer |
| 7,866,532 | B1 | 1/2011 | Potter et al. |
| 8,079,126 | B2 | 12/2011 | Bampton et al. |
| 8,114,474 | B1 | 2/2012 | Dudt et al. |
| 8,141,764 | B1 | 3/2012 | Potter et al. |
| 8,272,424 | B2 | 9/2012 | Short |
| 8,316,916 | B2 | 11/2012 | Heinrich et al. |
| 8,348,136 | B1 | 1/2013 | Potter et al. |
| 8,397,974 | B2 | 3/2013 | Schultz et al. |
| 8,632,850 | B2 | 1/2014 | Schultz et al. |
| 8,636,194 | B2 | 1/2014 | Schultz et al. |
| 8,710,144 | B2 | 4/2014 | Hesse et al. |
| 8,782,892 | B2 | 7/2014 | Seo et al. |
| 8,875,976 | B2 | 11/2014 | Schultz et al. |
| 8,893,954 | B2 | 11/2014 | Schultz et al. |
| 9,027,378 | B2 | 5/2015 | Crump et al. |
| 9,101,979 | B2 | 8/2015 | Hofmann et al. |
| 9,126,367 | B1 | 9/2015 | Mark et al. |
| 9,205,578 | B2 | 12/2015 | Schultz et al. |
| 9,233,438 | B2 | 1/2016 | Phelan et al. |
| 9,238,283 | B2 | 1/2016 | Gniesmer |
| 9,266,191 | B2 | 2/2016 | Kandasamy et al. |
| 9,511,445 | B2 | 12/2016 | Kandasamy |
| 9,511,446 | B2 | 12/2016 | Kandasamy et al. |
| 9,555,580 | B1 | 1/2017 | Dykstra et al. |
| 9,555,871 | B2 | 1/2017 | Grip et al. |
| 9,610,650 | B2 | 4/2017 | Hofmann et al. |
| 9,611,803 | B2 | 4/2017 | Vieira De Morais et al. |
| 9,643,279 | B2 | 5/2017 | Schultz et al. |
| 9,757,802 | B2 | 9/2017 | Cui et al. |
| 9,862,054 | B2 | 1/2018 | Kandasamy et al. |
| 9,931,789 | B2 | 4/2018 | Wiesner et al. |
| 9,937,587 | B2 | 4/2018 | Kou et al. |
| 9,943,929 | B2 | 4/2018 | Schultz et al. |
| 10,011,089 | B2 | 7/2018 | Lyons et al. |
| 10,022,796 | B2 | 7/2018 | Wang |
| 10,105,790 | B2 | 10/2018 | Kandasamy |
| 10,254,499 | B1 | 4/2019 | Cohen et al. |
| 10,259,041 | B2 | 4/2019 | Gessler et al. |
| 10,279,422 | B2 | 5/2019 | Werz et al. |
| 10,335,854 | B2 | 7/2019 | Wiesner et al. |
| 10,500,674 | B2 | 12/2019 | Kandasamy et al. |
| 10,543,529 | B2 | 1/2020 | Schwarze et al. |
| 10,583,519 | B2 | 3/2020 | Litwinski |
| 10,583,631 | B2 | 3/2020 | Kandasamy et al. |
| 10,625,374 | B2 | 4/2020 | Schwarze |
| 10,670,019 | B2 | 6/2020 | Zinniel et al. |
| 10,724,561 | B2 | 7/2020 | Amira et al. |
| 10,796,727 | B1 | 12/2020 | Coffey et al. |
| 10,857,596 | B1 | 12/2020 | Mittendorf et al. |
| 10,889,098 | B2 | 1/2021 | Yamazaki et al. |
| 10,906,127 | B2 | 2/2021 | Seo et al. |
| 10,953,489 | B2 | 3/2021 | Fröhlke et al. |
| 11,014,292 | B2 | 5/2021 | Marchione |
| 11,077,607 | B2 | 8/2021 | Snyder et al. |
| 11,219,951 | B2 | 1/2022 | Matthews et al. |
| 11,229,972 | B2 | 1/2022 | Mosaki et al. |
| 11,260,468 | B2 | 3/2022 | Frank et al. |
| 11,311,959 | B2 | 4/2022 | Hardwick et al. |
| 11,415,380 | B2 | 8/2022 | Chipko et al. |
| 11,772,188 | B1* | 10/2023 | Sargent ................. B33Y 30/00 228/112.1 |
| 11,981,460 | B2 | 5/2024 | Muceus et al. |
| 12,140,109 | B2 | 11/2024 | Song et al. |
| 2002/0014070 | A1 | 2/2002 | Stechman, Jr. et al. |
| 2003/0042292 | A1 | 3/2003 | Hatten et al. |
| 2003/0192941 | A1 | 10/2003 | Ishida et al. |
| 2004/0060965 | A1 | 4/2004 | Mishra |
| 2004/0074949 | A1 | 4/2004 | Narita et al. |
| 2004/0107019 | A1 | 6/2004 | Keshovmurthy et al. |
| 2004/0155094 | A1 | 8/2004 | Okamoto et al. |
| 2005/0035173 | A1 | 2/2005 | Steel et al. |
| 2005/0242158 | A1 | 11/2005 | Bolser |
| 2005/0279810 | A1 | 12/2005 | Stol et al. |
| 2006/0102699 | A1 | 5/2006 | Burton et al. |
| 2006/0169741 | A1 | 8/2006 | Smith et al. |
| 2006/0289604 | A1 | 12/2006 | Zettler et al. |
| 2007/0152015 | A1 | 7/2007 | Burton et al. |
| 2007/0158343 | A1 | 7/2007 | Shimada et al. |
| 2007/0194051 | A1 | 8/2007 | Bakken et al. |
| 2007/0199978 | A1 | 8/2007 | Ezumi |
| 2008/0096038 | A1 | 4/2008 | Nagano |
| 2008/0128473 | A1 | 6/2008 | Zhou et al. |
| 2009/0188109 | A1 | 7/2009 | Bampton et al. |
| 2010/0140321 | A1 | 6/2010 | Eller et al. |
| 2010/0167083 | A1 | 7/2010 | Park et al. |
| 2010/0242843 | A1 | 9/2010 | Peretti et al. |
| 2010/0252169 | A1 | 10/2010 | Feng et al. |
| 2010/0285207 | A1 | 11/2010 | Creehan et al. |
| 2011/0062219 | A1 | 3/2011 | Bezaire et al. |
| 2011/0262695 | A1 | 10/2011 | Lee et al. |
| 2011/0266330 | A1 | 11/2011 | Bruck et al. |
| 2011/0315367 | A1 | 12/2011 | Romero et al. |
| 2012/0009339 | A1 | 1/2012 | Creehan et al. |
| 2012/0058359 | A1 | 3/2012 | Kingston et al. |
| 2012/0073732 | A1 | 3/2012 | Perlman |
| 2012/0114861 | A1 | 5/2012 | Cohen et al. |
| 2012/0273555 | A1 | 11/2012 | Flak et al. |
| 2012/0279441 | A1 | 11/2012 | Creehan et al. |
| 2012/0279442 | A1 | 11/2012 | Creehan et al. |
| 2013/0056912 | A1 | 3/2013 | O'Neill et al. |
| 2013/0068825 | A1 | 3/2013 | Rosal et al. |
| 2014/0130736 | A1 | 5/2014 | Schultz et al. |
| 2014/0134325 | A1 | 5/2014 | Schultz et al. |
| 2014/0138332 | A1* | 5/2014 | Loree ....................... F16B 2/22 403/326 |
| 2014/0165399 | A1 | 6/2014 | Seo et al. |
| 2014/0174344 | A1 | 6/2014 | Scuhltz et al. |
| 2014/0274726 | A1 | 9/2014 | Sugimoto et al. |
| 2015/0079306 | A1 | 3/2015 | Schoeneborn et al. |
| 2015/0165546 | A1 | 6/2015 | Kandasamy et al. |
| 2015/0274280 | A1* | 10/2015 | Sheahan, Jr. ........... B64C 13/26 244/99.2 |
| 2015/0321289 | A1 | 11/2015 | Bruck et al. |
| 2016/0074958 | A1 | 3/2016 | Kandasamy et al. |
| 2016/0075059 | A1 | 3/2016 | Williams |
| 2016/0090848 | A1 | 3/2016 | Engeli et al. |
| 2016/0107262 | A1 | 4/2016 | Schultz et al. |
| 2016/0169012 | A1 | 6/2016 | Dacunha et al. |
| 2016/0175981 | A1 | 6/2016 | Kandasamy et al. |
| 2016/0175982 | A1 | 6/2016 | Kandasamy et al. |
| 2016/0258298 | A1 | 9/2016 | Channel et al. |
| 2016/0363390 | A1 | 12/2016 | Karlen et al. |

(56) References Cited

U.S. PATENT DOCUMENTS

| | | |
|---|---|---|
| 2017/0022615 A1 | 1/2017 | Arndt et al. |
| 2017/0043429 A1 | 2/2017 | Kandasamy et al. |
| 2017/0057204 A1 | 3/2017 | Kandasamy et al. |
| 2017/0080519 A1 | 3/2017 | Atin et al. |
| 2017/0150602 A1 | 5/2017 | Johnston et al. |
| 2017/0197274 A1 | 7/2017 | Steel et al. |
| 2017/0216962 A1 | 8/2017 | Schultz et al. |
| 2017/0284206 A1 | 10/2017 | Reberts et al. |
| 2017/0291221 A1 | 10/2017 | Swank et al. |
| 2017/0299120 A1 | 10/2017 | Stachulla et al. |
| 2017/0312850 A1 | 11/2017 | Werz et al. |
| 2018/0047645 A1 | 2/2018 | Varadarajan et al. |
| 2018/0085849 A1 | 3/2018 | Kandasamy et al. |
| 2018/0126636 A1 | 5/2018 | Jang |
| 2018/0257141 A1 | 9/2018 | Hofmann et al. |
| 2018/0296343 A1 | 10/2018 | Wei |
| 2018/0361501 A1 | 12/2018 | Hardwick et al. |
| 2019/0054534 A1 | 2/2019 | Norton et al. |
| 2019/0168304 A1 | 6/2019 | Krol et al. |
| 2019/0193194 A1 | 6/2019 | Grong et al. |
| 2019/0210152 A1* | 7/2019 | Konitzer ............... B33Y 30/00 |
| 2019/0217508 A1 | 7/2019 | McGinnis et al. |
| 2019/0299290 A1 | 10/2019 | Kuhns et al. |
| 2019/0388128 A1 | 12/2019 | Wilson et al. |
| 2020/0016687 A1 | 1/2020 | Whalen et al. |
| 2020/0047279 A1 | 2/2020 | Misak |
| 2020/0063242 A1 | 2/2020 | Angels |
| 2020/0101559 A1 | 4/2020 | Rose et al. |
| 2020/0180297 A1 | 6/2020 | Carter et al. |
| 2020/0189025 A1* | 6/2020 | Rodriguez ............ B23K 20/22 |
| 2020/0198046 A1 | 6/2020 | Imaizumi et al. |
| 2020/0209107 A1 | 7/2020 | Ream et al. |
| 2020/0247058 A1 | 8/2020 | Flitsch et al. |
| 2020/0262001 A1 | 8/2020 | Uetani |
| 2020/0290127 A1 | 9/2020 | Berglund et al. |
| 2020/0306869 A1 | 10/2020 | Hardwick et al. |
| 2020/0332421 A1 | 10/2020 | Jahdie et al. |
| 2020/0338639 A1 | 10/2020 | Friesth |
| 2021/0008658 A1 | 1/2021 | Frank et al. |
| 2021/0048053 A1 | 2/2021 | Ahn |
| 2021/0053283 A1 | 2/2021 | Liu et al. |
| 2021/0069778 A1 | 3/2021 | Redding et al. |
| 2021/0078258 A1 | 3/2021 | Lalande et al. |
| 2021/0180165 A1 | 6/2021 | Pasebani et al. |
| 2021/0245293 A1 | 8/2021 | Hardwick et al. |
| 2021/0308937 A1 | 10/2021 | Broach et al. |
| 2021/0379664 A1 | 12/2021 | Gibson et al. |
| 2021/0387253 A1 | 12/2021 | Schweizer et al. |
| 2022/0016834 A1* | 1/2022 | West ..................... B21D 39/028 |
| 2022/0023821 A1 | 1/2022 | Aimone et al. |
| 2022/0049331 A1 | 2/2022 | Angels |
| 2022/0080522 A1 | 3/2022 | Cox et al. |
| 2022/0088681 A1* | 3/2022 | Chehab ................. B33Y 10/00 |
| 2022/0176451 A1 | 6/2022 | Schweizer et al. |
| 2022/0281005 A1 | 9/2022 | Kandasamy |
| 2022/0388091 A1 | 12/2022 | Norman et al. |
| 2022/0389543 A1* | 12/2022 | Chehab ................. B22F 10/00 |
| 2023/0146110 A1* | 5/2023 | Allison ................. B33Y 30/00 |
| | | 228/112.1 |
| 2023/0150052 A1* | 5/2023 | Haynes ................ B23K 35/325 |
| | | 228/112.1 |
| 2023/0356322 A1* | 11/2023 | Haynie ................. B33Y 10/00 |
| 2024/0100624 A1 | 3/2024 | Hardwick et al. |
| 2024/0109245 A1 | 4/2024 | Lalande et al. |
| 2024/0149373 A1 | 5/2024 | Munn et al. |
| 2024/0326155 A1* | 10/2024 | Song .................... B23K 20/128 |
| 2024/0326156 A1* | 10/2024 | Song .................... B23K 20/1255 |
| 2024/0328373 A1 | 10/2024 | Song et al. |
| 2024/0328374 A1 | 10/2024 | Song et al. |

FOREIGN PATENT DOCUMENTS

| | | |
|---|---|---|
| AU | 2018359514 A1 | 5/2019 |
| AU | 2019234726 A1 | 9/2019 |
| AU | 2019290657 A1 | 12/2019 |
| AU | 2019338384 A1 | 3/2020 |
| AU | 2019383418 A1 | 5/2020 |
| AU | 2018359514 C1 | 5/2021 |
| CA | 2569350 A1 | 5/2007 |
| CA | 2569773 C | 4/2013 |
| CA | 3081330 A1 | 10/2018 |
| CA | 3093812 A1 | 3/2019 |
| CA | 3104289 A1 | 6/2019 |
| CA | 3112446 A1 | 9/2019 |
| CA | 3120796 A1 | 11/2019 |
| CN | 101629290 A | 1/2010 |
| CN | 101537538 B | 1/2011 |
| CN | 102069172 A | 5/2011 |
| CN | 101406987 B | 3/2012 |
| CN | 203843367 U | 9/2014 |
| CN | 109202271 A | 1/2015 |
| CN | 104439686 A | 3/2015 |
| CN | 103639668 B | 12/2015 |
| CN | 105290608 A | 2/2016 |
| CN | 105750725 A | 7/2016 |
| CN | 103978304 B | 9/2016 |
| CN | 105965152 A | 9/2016 |
| CN | 106001905 A | 10/2016 |
| CN | 106735851 A | 5/2017 |
| CN | 107030371 A | 8/2017 |
| CN | 206366652 U | 8/2017 |
| CN | 107160030 A | 9/2017 |
| CN | 107160109 A | 9/2017 |
| CN | 107498175 A | 12/2017 |
| CN | 206925453 U | 1/2018 |
| CN | 107813044 A | 3/2018 |
| CN | 107841744 A | 3/2018 |
| CN | 108372359 A | 8/2018 |
| CN | 108385101 A | 8/2018 |
| CN | 108838509 A | 11/2018 |
| CN | 109202273 A | 1/2019 |
| CN | 109261940 A | 1/2019 |
| CN | 107584122 B | 2/2019 |
| CN | 107116366 B | 3/2019 |
| CN | 109940524 A | 6/2019 |
| CN | 110042385 A | 7/2019 |
| CN | 209272731 U | 8/2019 |
| CN | 110653618 A | 1/2020 |
| CN | 107900510 B | 2/2020 |
| CN | 110834179 A | 2/2020 |
| CN | 111331246 A | 2/2020 |
| CN | 110933791 A | 3/2020 |
| CN | 109878084 B | 6/2020 |
| CN | 108971742 B | 7/2020 |
| CN | 109202273 B | 9/2020 |
| CN | 111655403 A | 9/2020 |
| CN | 211464825 U | 9/2020 |
| CN | 109202275 B | 10/2020 |
| CN | 111761198 A | 10/2020 |
| CN | 108603504 B | 11/2020 |
| CN | 109940163 B | 12/2020 |
| CN | 112108756 B | 12/2020 |
| CN | 108930034 B | 1/2021 |
| CN | 112207414 A | 1/2021 |
| CN | 109202272 B | 2/2021 |
| CN | 109570934 B | 2/2021 |
| CN | 112355463 A | 2/2021 |
| CN | 112404453 A | 2/2021 |
| CN | 109967860 B | 3/2021 |
| CN | 112496522 A | 3/2021 |
| CN | 110640294 B | 4/2021 |
| CN | 112658460 A | 4/2021 |
| CN | 109570933 B | 5/2021 |
| CN | 112770884 A | 5/2021 |
| CN | 112828441 A | 5/2021 |
| CN | 110102871 B | 6/2021 |
| CN | 112958902 A | 6/2021 |
| CN | 113001007 A | 6/2021 |
| CN | 113020625 A | 6/2021 |
| CN | 113172331 A | 7/2021 |
| CN | 111531266 B | 8/2021 |
| CN | 214212574 U | 9/2021 |
| CN | 111230282 B | 10/2021 |

(56) References Cited

FOREIGN PATENT DOCUMENTS

| | | | |
|---|---|---|---|
| CN | 113523534 | A | 10/2021 |
| CN | 113695573 | A | 11/2021 |
| CN | 113695593 | A | 11/2021 |
| CN | 113828907 | A | 12/2021 |
| CN | 113857643 | A | 12/2021 |
| CN | 214977765 | U | 12/2021 |
| CN | 111055007 | B | 1/2022 |
| CN | 215468782 | U | 1/2022 |
| CN | 114131176 | A | 3/2022 |
| CN | 217096135 | U | 3/2022 |
| CN | 113172331 | B | 4/2022 |
| CN | 114393292 | A | 4/2022 |
| CN | 111575698 | B | 5/2022 |
| CN | 111575699 | B | 5/2022 |
| CN | 113146021 | B | 6/2022 |
| CN | 114669858 | A | 6/2022 |
| CN | 216780643 | U | 6/2022 |
| CN | 111872543 | B | 7/2022 |
| CN | 112025074 | B | 7/2022 |
| CN | 113118612 | B | 7/2022 |
| CN | 113351984 | B | 7/2022 |
| CN | 114770784 | A | 7/2022 |
| CN | 114799201 | A | 7/2022 |
| CN | 114799480 | A | 7/2022 |
| CN | 112407338 | B | 8/2022 |
| CN | 113001005 | B | 8/2022 |
| CN | 114833439 | A | 8/2022 |
| CN | 114951954 | A | 8/2022 |
| CN | 115055699 | A | 9/2022 |
| CN | 115091022 | A | 9/2022 |
| CN | 115156523 | A | 10/2022 |
| CN | 115178855 | A | 10/2022 |
| CN | 115351514 | A | 11/2022 |
| CN | 217729675 | U | 11/2022 |
| CN | 115502543 | A | 12/2022 |
| CN | 115555700 | A | 1/2023 |
| CN | 115673528 | A | 2/2023 |
| CN | 115091025 | B | 3/2023 |
| CN | 115740727 | A | 3/2023 |
| CN | 218694877 | U | 3/2023 |
| CN | 113927151 | B | 4/2023 |
| CN | 114769922 | B | 4/2023 |
| CN | 218799795 | U | 4/2023 |
| CN | 218799797 | U | 4/2023 |
| CN | 218799801 | U | 4/2023 |
| CN | 116038093 | A | 5/2023 |
| CN | 116140783 | A | 5/2023 |
| CN | 116160108 | A | 5/2023 |
| CN | 115106641 | B | 6/2023 |
| CN | 115740726 | B | 6/2023 |
| CN | 116423033 | A | 7/2023 |
| CN | 116475558 | A | 7/2023 |
| CN | 219336363 | U | 7/2023 |
| CN | 219336364 | U | 7/2023 |
| CN | 219379326 | U | 7/2023 |
| CN | 116511543 | A | 8/2023 |
| CN | 116571769 | A | 8/2023 |
| CN | 116618816 | A | 8/2023 |
| CN | 115673526 | B | 9/2023 |
| CN | 116900465 | A | 10/2023 |
| CN | 116900467 | A | 10/2023 |
| CN | 116921840 | A | 10/2023 |
| CN | 116926531 | A | 10/2023 |
| CN | 220050404 | U | 11/2023 |
| CN | 117340415 | A | 1/2024 |
| CN | 117428313 | A | 1/2024 |
| CN | 220591878 | U | 3/2024 |
| CN | 117817098 | A | 4/2024 |
| CN | 117943678 | A | 4/2024 |
| DE | 19948441 | A1 | 4/2001 |
| DE | 202015002830 | U1 | 4/2015 |
| DE | 102014115535 | B3 | 3/2016 |
| DE | 102015216802 | A1 | 3/2017 |
| DE | 102016113289 | A1 | 1/2018 |
| DE | 102019106873 | A1 | 9/2020 |
| DE | 102019007902 | A1 | 5/2021 |
| EP | 1206995 | A2 | 5/2002 |
| EP | 1413384 | A2 | 4/2004 |
| EP | 3251768 | A1 | 12/2017 |
| EP | 3703888 | A1 | 10/2018 |
| EP | 4129552 | A1 | 2/2023 |
| FR | 3135002 | A1 | 11/2023 |
| FR | 3139018 | A1 | 3/2024 |
| GB | 2306366 | A | 5/1997 |
| GB | 2576260 | B | 2/2020 |
| GB | 2614889 | A | 7/2023 |
| IN | 2023/31035542 | A | 9/2023 |
| JP | H 1147960 | A | 2/1999 |
| JP | H 11156561 | A | 6/1999 |
| JP | 2000094159 | A | 4/2000 |
| JP | 20000334577 | A | 12/2000 |
| JP | 2003-322135 | A | 11/2003 |
| JP | 2004025296 | A | 1/2004 |
| JP | 3563003 | B2 | 9/2004 |
| JP | 2004261859 | A | 9/2004 |
| JP | 2004-311640 | A | 11/2004 |
| JP | 2005-171299 | A | 6/2005 |
| JP | 2007-061875 | A | 3/2007 |
| JP | 2009006396 | A | 1/2009 |
| JP | 2009-090295 | A | 4/2009 |
| JP | 4299266 | B2 | 7/2009 |
| JP | 2010-194557 | A | 9/2010 |
| JP | 5071144 | B2 | 11/2012 |
| JP | 5573973 | B2 | 1/2013 |
| JP | 6046954 | B2 | 2/2013 |
| JP | 2013166159 | A | 8/2013 |
| JP | 5326757 | B2 | 10/2013 |
| JP | 5864446 | B2 | 2/2016 |
| JP | 6201882 | B2 | 9/2017 |
| JP | 6365752 | B2 | 8/2018 |
| JP | 2020032429 | A | 3/2020 |
| JP | 2020059039 | A | 4/2020 |
| JP | 6909034 | B2 | 7/2021 |
| JP | 2022-503795 | A | 1/2022 |
| JP | 7148491 | B2 | 10/2022 |
| KR | 10-0354387 | B1 | 12/2002 |
| KR | 10-0772131 | B1 | 11/2007 |
| KR | 20100113400 | A | 10/2010 |
| KR | 20110003572 | A | 1/2011 |
| KR | 20110019270 | A | 2/2011 |
| KR | 20110088266 | A | 8/2011 |
| KR | 10-1194097 | B1 | 10/2012 |
| KR | 10-1230359 | B1 | 2/2013 |
| KR | 20160128939 | A | 11/2016 |
| KR | 20180044625 | A | 5/2018 |
| KR | 2021113973 | | 9/2019 |
| KR | 20210049085 | A | 9/2019 |
| KR | 10-2101364 | B1 | 4/2020 |
| KR | 20200087172 | A | 7/2020 |
| KR | 20210010980 | A | 1/2021 |
| KR | 10-2273514 | B1 | 6/2021 |
| KR | 20210130704 | A | 10/2021 |
| KR | 20230069412 | A | 5/2023 |
| KR | 20230134143 | A | 9/2023 |
| KR | 10-2595360 | B1 | 10/2023 |
| TW | I688451 | B | 3/2020 |
| WO | WO 1998/051441 | A1 | 11/1998 |
| WO | WO 2000/020146 | A1 | 4/2000 |
| WO | WO 2009/127981 | A2 | 10/2009 |
| WO | WO 2009/142070 | A1 | 11/2009 |
| WO | WO 2011/017752 | A1 | 2/2011 |
| WO | WO 2012/065616 | A1 | 5/2012 |
| WO | WO 2012/141442 | A2 | 10/2012 |
| WO | WO 2013/076884 | A1 | 5/2013 |
| WO | WO 2014/057948 | A1 | 4/2014 |
| WO | WO 2014/178731 | A2 | 11/2014 |
| WO | WO 2015/060007 | A1 | 4/2015 |
| WO | WO 2015/198910 | A1 | 12/2015 |
| WO | WO 2016/072211 | A1 | 5/2016 |
| WO | WO 2016/106179 | A1 | 6/2016 |
| WO | WO 2016/111279 | A1 | 7/2016 |
| WO | WO 2017075396 | A1 | 5/2017 |
| WO | WO 2019/089764 | A1 | 5/2019 |
| WO | WO 2019/099928 | A2 | 5/2019 |

(56) References Cited

FOREIGN PATENT DOCUMENTS

| WO | WO 2019/115968 A1 | 6/2019 |
|---|---|---|
| WO | WO 2019/172300 A1 | 9/2019 |
| WO | WO 2019178138 A2 | 9/2019 |
| WO | WO 2019178138 A3 | 9/2019 |
| WO | WO 2019/198290 A1 | 10/2019 |
| WO | WO 2019246251 A2 | 12/2019 |
| WO | WO 2019246251 A3 | 12/2019 |
| WO | WO 2019246251 A9 | 12/2019 |
| WO | WO 2020/015228 A1 | 1/2020 |
| WO | WO 2020055989 A1 | 3/2020 |
| WO | WO 2020106952 A1 | 5/2020 |
| WO | WO 2020/201299 A1 | 10/2020 |
| WO | WO 2021/030693 A2 | 2/2021 |
| WO | WO 2021/054894 A1 | 3/2021 |
| WO | WO 2021/067978 A1 | 4/2021 |
| WO | WO 2021/165545 A1 | 8/2021 |
| WO | WO 2022032061 A1 | 2/2022 |
| WO | WO 2022/159278 A1 | 7/2022 |
| WO | WO 2022231423 A1 | 11/2022 |
| WO | WO 2023/006180 A1 | 2/2023 |
| WO | WO 2023087631 A1 | 5/2023 |
| WO | WO 2023/099872 A1 | 6/2023 |
| WO | WO 2024/078248 A1 | 4/2024 |

OTHER PUBLICATIONS

Carter, RW et al. "Robotic Manufacturing of 18 ft. (5.5mm) Diameter Cryogenic Fuel Tank Dome Assemblies for the NASA Ares I Rocket", TWI 9th International Symposium on Friction Stir Welding 2012, May 15, 2012, 25 pages.

Rezaeinajad, SS et al., "Solid-State Additive Manufacturing of AA6060 Employing Friction Screw Extrusion", JOM 75: 4199-4211, Aug. 17, 2023, 13 pages.

Das, S. et al., "Selective Laser Sintering of High Performance High Temperature Materials", Laboratory for Freeform Fabrication, University of Texas at Austin, 1996, pp. 89-96.

Grätzel, M., "Advances in friction stir welding by separate control of shoulder and probe", Welding in the World (2021) 54:1931-1941.

Ohashi, T. et al., "Fastenerless-Riveting Utilizing Friction Stir Forming for Dissimilar Materials Joining", Key Engineering Materials, Aug. 2017, ISSN: 1662-9795, vol. 751, pp. 186-191, doi: 10.4028/www.scientific.net/KEM.751.186.

Miedzinski Mattias, "Materials for Additive Manufacturing by Direct Energy Deposition", Chalmers University of Technology Master's Thesis in Materials Engineering, 2017, http://publications.lib.chalmers.se/records/fulltext/253822/253822.pdf.

Mahmood. M, et al. "Metal Matrix Composites Synthesized by Laser-Melting Deposition: A Review", MDPI.com/journal/materials- Materials, 2020, vol. 13, 02593. https://www.mdpi.com/1996-1944/13/11/2593.

Davis, "Theoretical Analysis of Transpiration Cooling of a Liquid Rocket Thrust Chamber Wall", 2006, Theses—Embry-Riddle Aeronautical University, Daytona Beach, Florida, 103 pages.

Luo et al. Effects of Coolants of Double Layer Transpiration Cooling System in the Leading Edge of a Hypersonic Vehicle, Frontiers in Energy Research www.frontiersin.org, Sep. 9, 2021, vol. 9, Article 756820, https://www.frontiersin.org/articles/10.3389/fenrg.2021.756820/full.

Ohashi, T. et al., "Pseudo linear joining for dissimilar materials utilizing punching and Friction Stir Forming", Procedia Manufacturing, 2020, vol. 50, pp. 98-103.

Cold Spray Additive Manufactured Combustion Chamber, Impact Innovations GmbH, https://impact-innovations.com/en/applications/combustion-chamber/, 4 pages, Jun. 24, 2023.

Russell et al. "Performance Improvement of Friction Stir Welds by Better Surface Finish", George C. Marshall Space Flight Center Research and Technology Report 2014, 2 Pages, Jan. 1, 2015.

Zhao et al. "Interfacial Bonding Features of Friction Stir Additive Manufactured Build for 2195-T8 Aluminum-Lithium Alloy" Journal of Manufacturing Processes 38, Jan. 2019, 15 pages.

Li et al, "Cold Spray+ as New Hybrid Additive Manufacturing Technology: A Literature Review" Science and Technology of Welding and Joining, 24(5), Apr. 15, 2019, pp. 420-445.

Khodabakhshi et al., "Surface Modification of a Cold Gas Dynamic Spray-deposited Titanium Coating on Aluminum Alloy by Using Friction-Stir Processing" Journal of Thermal Spray Technology, vol. 28, Aug. 2019, pp. 1185-1198.

Wang et al. "High Performance Bulk Pure Al Prepared Through Cold Spray-friction Stir Processing Compositive Additive Manufacturing" Journal of Materials Research and Technology, 9(4), Jun. 2020, pp. 9073-9079.

Hassan et al. "A Comprehensive Review of Friction Stir Additive Manufacturing (FSAM) of Non-Ferrous Alloys" Materials 16(7): 2723, Mar. 2023, 31 pages.

Zhao et al. "Influence of Tool Shape and Process on Formation and Defects of Friction Stir Additive Manufactured Build" Journal of Materials Engineering, vol. 47 Issue 9, Sep. 2019, pp. 84-92.

Saju, T. P. et al., "Joining dissimilar grade aluminum alloy sheets using multi-hole dieless friction stir riveting process", The International Journal of Advanced Manufacturing Technology, 2021, 112: 285-302.

Bobbin Tool Friction Stir Welding Developed, TWI-Global.com, 3 pages, date accessed Nov. 5, 2024.

Stationary Shoulder Friction Stir Welding, TWI-Global.com, 2 pages, date accessed Nov. 5, 2024.

* cited by examiner

FRICTION STIR ADDITIVE MANUFACTURING FORMED PARTS AND STRUCTURES WITH INTEGRATED PASSAGES

BACKGROUND

Field

The technology relates generally to the use of friction stir additive manufacturing to form parts and structures having integrated passages.

Description of the Related Art

The formation of parts and structures having integrated passages can be very costly, labor intensive, and prone to quality issues. The large number of manufacturing steps needed can lead to these and other issues. Typically, it is easier to attach passages to the exterior of a part or structure after the part or structure is formed, rather than form integral passages as the part or structure is being formed. It is therefore desirable to have an efficient manufacturing process with limited steps to form parts with integrated passages.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description" one will understand how the features of the embodiments described herein provide advantages over existing approaches over existing methods of forming parts and/or structures having integrated passages using friction stir additive manufacturing.

In one aspect, a method of additive manufacturing a part is provided. The method includes forming a first part and a second part separate from the first part. Each part has a near net shape. The first part and the second part are formed by moving a friction stir tool configured to deposit a filler material. The method also includes machining an inner surface of each part to form a generally smooth surface. The method also includes joining the first part and the second part to form a structure. The inner surfaces of the first part and the second part define an interior space of the structure. The method also includes machining the structure to form a generally smooth outer surface. The method also includes machining a plurality of grooves extending into the outer surface of the structure. The plurality of grooves are sized to each receive a tube. The method also includes placing a tube into each of the plurality of grooves. The method also includes depositing a layer of material configured to secure the tubes within the plurality of grooves by moving the friction stir tool across the outer surface of the structure. The method also includes machining the outer surface of the structure to form a predetermined shape.

In some embodiments, the first part and the second part are hemispheres. In some embodiments, the tubes are configured to transport a liquid for heat exchange. In some embodiments, the structure has a cylindrical shape. In some embodiments, the structure is a tank. In some embodiments, joining the first part and the second part includes at least one of welding, gluing, melting, and fastening the first part and the second part to form the structure. In some embodiments, the friction stir tool includes a spindle having a channel extending along a central axis of the spindle and configured to hold the filler material. Forming a first part and a second part includes rotating the spindle of the friction stir tool to deposit the filler material held in the channel.

In another aspect, a method of additive manufacturing a part is provided. The method includes forming a first part having a near net shape and a second part having a near net shape, by depositing layers of material using a friction stir tool, a new layer added to a surface of a previously deposited layer. The method also includes joining the first part and the second part to form a structure. An inner surface of the first part and an inner surface of the second part defines an interior space of the structure. The method also includes machining a plurality of grooves extending into an outer surface of the structure. The plurality of grooves are sized to each receive a wire. The method also includes positioning a wire into each of the plurality of grooves. The method also includes securing the wires within the plurality of grooves with additional material deposited over the wires. The method also includes machining the outer surface of the structure to form a predetermined shape.

In some embodiments, the method includes machining the inner surface of the first part and the inner surface of the second part to form generally smooth inner surfaces. In some embodiments, the first part and the second part are hemispheres. In some embodiments, the structure has a cylindrical shape. In some embodiments, the structure is a tank and the interior space is configured to hold a gas or a liquid. In some embodiments, the wires comprise hollow wires. In some embodiments, the hollow wires are configured to transport a gas or a liquid for heat exchange. In some embodiments, the wires comprise solid wires. In some embodiments, the wires comprise solid aluminum wires. In some embodiments, the method includes removing the solid wires from the predetermined shape using a chemical or thermal process. In some embodiments, the material is a first material and the wires are formed of a second material different than the first material. In some embodiments, the material is a first material and the wires are formed of a second material that is the same as or substantially the same as the first material. In some embodiments, joining the first part and the second part includes at least one of welding, gluing, melting, and fastening the first part and the second part to form the structure.

In another aspect, a structure comprising integrated passages produced by an additive manufacturing process is provided. The process includes forming a first initial part having a near net shape by moving a friction stir tool to deposit layers of material in a predetermined formation. The process also includes forming a second initial part having a near net shape by moving a friction stir tool to deposit layers of material in a predetermined formation. The process also includes joining the first initial part and the second initial part. The process also includes machining a plurality of grooves into an external surface of the joined structure. The process also includes positioning a tube into each of the plurality of grooves. The process also includes moving the friction stir tool across the surface of the structure and depositing an additional layer of material to secure the tubes within the plurality of grooves. The process also includes machining the additional layer of material or at least one layer deposited over the additional layer of material to a predetermined shape.

In some embodiments, the friction stir tool comprises a spindle having a channel extending along a central axis of the spindle and configured to hold the material. Forming a first initial part having a near net shape and a second initial part having a near net shape includes rotating the spindle of the friction stir tool to deposit the material held in the channel in the predetermined formation. In some embodiments, the process includes machining an inner surface of the first initial part and an inner surface of the second initial part to form generally smooth inner surfaces. In some embodiments, the structure has a cylindrical shape. In some embodiments, the structure comprises a tank. In some embodiments, the first initial part and the second initial part are hemispheres. In some embodiments, the material is copper. In some embodiments, the tubes are configured to transport a gas or a liquid. In some embodiments, the material is a first material and the tubes are formed of a second material different than the first material. In some embodiments, the material is a first material and the tubes are formed of a second material that is the same as or substantially the same as the first material. In some embodiments, joining the first initial part and the second initial part includes at least one of welding, gluing, melting, and fastening the first initial part and the second initial part.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. In some drawings, various structures according to embodiments of the present disclosure are schematically shown. However, the drawings are not necessarily drawn to scale, and some features may be enlarged while some features may be omitted for the sake of clarity. It will be readily understood that the aspects of the present disclosure, as generally described herein, and illustrated in the figures, can be arranged, substituted, combined, and designed in a wide variety of different configurations, all of which are explicitly contemplated and make part of this disclosure.

DETAILED DESCRIPTION

The following detailed description is directed to certain specific embodiments of the present disclosure. Reference in this specification to "one embodiment," "an embodiment," or "in some embodiments" means that a particular feature, structure, or characteristic described in connection with the embodiment is included in at least one embodiment of the present disclosure. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others.

Various embodiments will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the present disclosure. Furthermore, embodiments of the present disclosure may include several novel features, no single one of which is solely responsible for its desirable attributes or which is essential to practicing the present disclosure.

Embodiments of the present disclosure relate generally to the use of friction stir additive manufacturing (FSAM) to form parts or structures with integrated passages or other hollow internal structures. It can be understood that two or more parts can be joined to form a structure and that a single part can be a structure. Friction stir additive manufacturing devices and methods can use a tool with a high speed rotation sleeve or spindle that generates heat to soften a filler material or feed stick material. For example, the sleeve or spindle can rotate at a speed between 200 rpm and 600 rpm. Under a high pressure applied by the rotating spindle, the softened material will flow out from the spindle and can be deposited on a part or a component, for example a substrate or workpiece. The tool can be moved repeatedly over the same area to apply additional layers of materials. Alternatively, the part that the material is applied to can be moved relative to the tool. This can be used to form a part with integrated passages or other hollow internal structures.

The use of FSAM to form parts and/or structures provides various advantages. For example, FSAM uses a low process temperature. The materials used to form the parts and structures are not melted, and can be molded and joined while the material is in a softened state. FSAM also allows for better material properties. Since the materials are not melted, the materials do not experience significant precipitation reactions or phase changes. The properties of the incoming material are close to the properties of the final part. FSAM can be multifunctional. For example, FSAM can be used to build a part using different materials, such as aluminum and copper, together in a component, such as a heat exchanger. The component can benefit from advantages associated with the different materials. For example, while copper can be more effective in conducting heat than aluminum, aluminum can have better structural efficiency, such that thermal and structural benefits can be integrated into the same component. In addition, FSAM is a solid-state process uniquely suited to embed objects, for example channels, passages, and sensors, into solid parts by depositing a softened filler material over the objects.

The parts, structures, systems, and methods described herein can use FSAM to build near net shape structures and parts having integrated or embedded passages or other hollow internal structures. For example, embodiments of the present disclosure can integrate or embed passages, such as cooling channels, in various structures, including but not limited to nozzles for rocket engines, heat exchanges, actively-cooled structures, and propellant tanks, as these structures are being formed. In a first FSAM process, FSAM can be used to form a near net shape part or structure. The near net shape structure or part can be a base structure. In a first machining process, a first surface or initial outer surface of the base structure can be machined to include a plurality of grooves or channels. Tubes, conduits, or other hollow structures can be inserted into the grooves or channels. In a second FSAM process, FSAM can then be used to seal the tubes within the base structure. The sealing of the tubes, conduits, or hollow structures within the base structure can provide protection to the tubes, conduits, or hollow structures. This can prevent structural and/or heat-related damage to the tubes, conduits, or hollow structures. In a second machining process, a second surface, for example, a new outer surface of the base structure formed by the material that overlies the tubes, conduits, or hollow structures, can be machined to form a smooth outer surface. Embodiments of FSAM processes according to the present disclosure can reduce manufacturing costs, reduce manufacturing steps and time, simplify quality control, and enhance structural reliability and integrity of structures formed with integrated passages.

Figure 1:
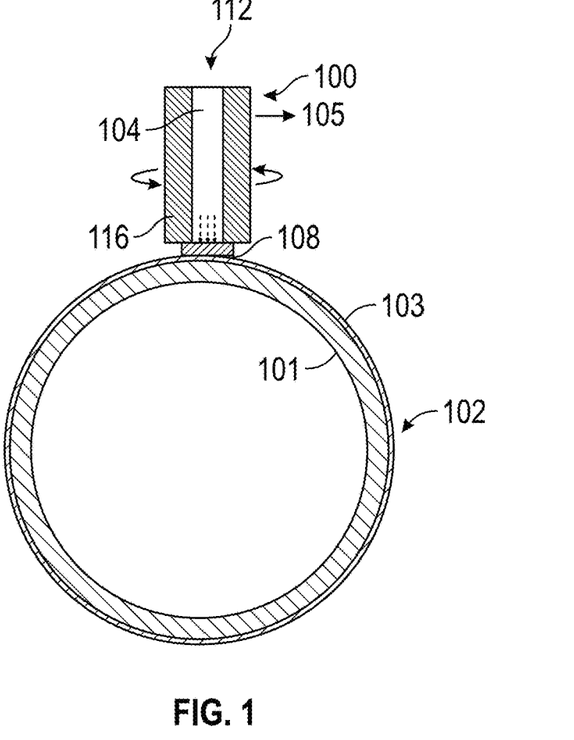
FIG. 1 is a schematic view of an additive manufacturing tool being used to form a part according to an embodiment of the present disclosure.

Various example embodiments of the present disclosure will now be described with respect to the figures. FIG. 1 is a schematic view of an additive manufacturing tool 100 configured to form a part 102 according to an embodiment of the present disclosure. The additive manufacturing tool 100 can be used to deposit a filler material 104 to a deposition zone 108. Example filler materials include but are not limited to copper, titanium, steels, and nickel alloys. The filler material 104 can be a single type of material or a mixture of materials. The filler material 104 can flow through a channel 112 of a spindle 116. The spindle 116 can be configured to rotate about a central axis extending through the center of the spindle 116. The rotation of the spindle 116 can generate heat to soften the filler material 104, which can allow the filler material 104 to flow through the channel 112 and to the deposition zone 108.

The spindle 116 can be configured to move transversely across a substrate 101 to form an initial layer 103 of the part 102. The spindle 116 can then continue to move transversely across the surface of the part 102 to form additional layers, one on top of the next. For example, the spindle 116 can be moved in the direction of arrow 105 while the part 102 remains stationary. Alternatively, the part 102 can be moved and the spindle 116 can remain stationary. In still another embodiment, the part 102 and the spindle 116 can both move as layers of material are deposited. While the spindle 116 is moved across the current outer surface of the part 102, for example, the surface of the initial layer 103 as shown in FIG. 1, the filler material currently being deposited can continue to exit the spindle 116 and be deposited to the deposition zone 108. The deposition zone 108 can include the area where the filler material exits the additive manufacturing device 100 and/or the area where the filler material contacts the part 102 or uppermost layer of material that was previously deposited. As the spindle 116 moves across the surface of the part 102, the deposition zone 108 can move to correspond to where the filler material is currently being deposited. The filler material that has exited the spindle 116 can remain at the location where it was deposited. The spindle 116 can be moved along the surface of the part 102 a predetermined number of times to deposit a predetermined number of layers of filler material 104.

While FIG. 1 depicts one initial layer 103 deposited on the substate 101, any number of layers can be deposited to form the part 102, for example, one layer, two layers, three layers, four layers, or more. The number of layers deposited can be predetermined based on the desired characteristics of the final part. The substrate 101 can be preformed or additive manufactured. The substate 101 can include the same or different material as the filler material being deposited. The substate 101 can be removed from the part 102 after the final part is formed or the substrate 101 can remain a portion of the final part.

The additive manufacturing tool 100 can be used to deposit filler material on a curved surface of a part 102, as illustrated in the example embodiment of FIG. 1. In another non-limiting example, the additive manufacturing tool 100 can be used to deposit filler material on a generally planar surface of a part, as will be described below with reference to the example embodiment of FIG. 2.

Figure 2:
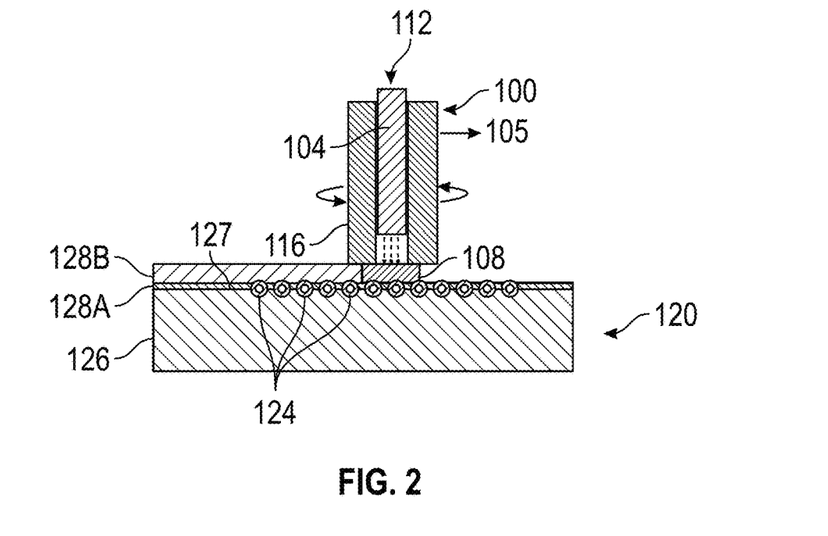
FIG. 2 is a cross-sectional view of an additive manufacturing tool being used to form a part having integrated passages according to an embodiment of the present disclosure.

FIG. 2 is a cross-sectional view of the additive manufacturing tool 100 being used to form a part 120 having integrated passages 124 according to an embodiment of the present disclosure. The base structure or base layer 126 can be formed using the additive manufacturing tool 100. Alternatively, the base structure or base layer 126 can be formed using any suitable manufacturing method. The base 126 can include one or more layers. The number of layers forming the base 126 can be dependent on the desired characteristics of the final part. For example, the number of layers can be adjusted to achieve a desired shape of the final part, a desired thickness of the final part, and a desired location of the passages 124.

The part 120 can have one or more passages 124. The passages 124 can be disposed over a top surface 127 of base 126, in contact with the top surface 127 of the base 126, and/or at least partially within the base 126. This is discussed in more detail below with reference to FIG. 4. The passages 124 can be disposed adjacent to each other, in a uniform pattern and/or in a non-uniform pattern. For example, the passages 124 can be positioned at different depths within the part 120. For another example, each passage 124 can be spaced a uniform or a non-uniform distance from adjacent passages 124. Many different configurations can be suitably implemented. In one non-limiting embodiment, a first passage 124 or set of passages 124 can be positioned after a first predetermined number of layers of material. A second passage 124 or set of passages 124 can be positioned after a second predetermined number of layers of material, the second predetermined number of layers being different than the first. The passages 124 can be formed using tubing, conduits, or the like. Once positioned over and/or in contact with the surface of the base 126, the passages 124 can be sealed in place by using the additive manufacturing tool 100 to deposit one or more layers on top of and/or around the passages 124, for example, layers 128A and 128B. The layers 128A, 128B can vary in thickness or have the same thickness. As shown in FIG. 2, the layer 128A has a smaller thickness than the layer 128B which is shown as in the process of being deposited on top of layer 128A. The layers 128A, 128B will transition from a softened state to a hardened state over and/or around the passages 124, securing the passages 124 within the final part 120. Non-limiting embodiments of these processes are described in more detail below.

Figure 3:
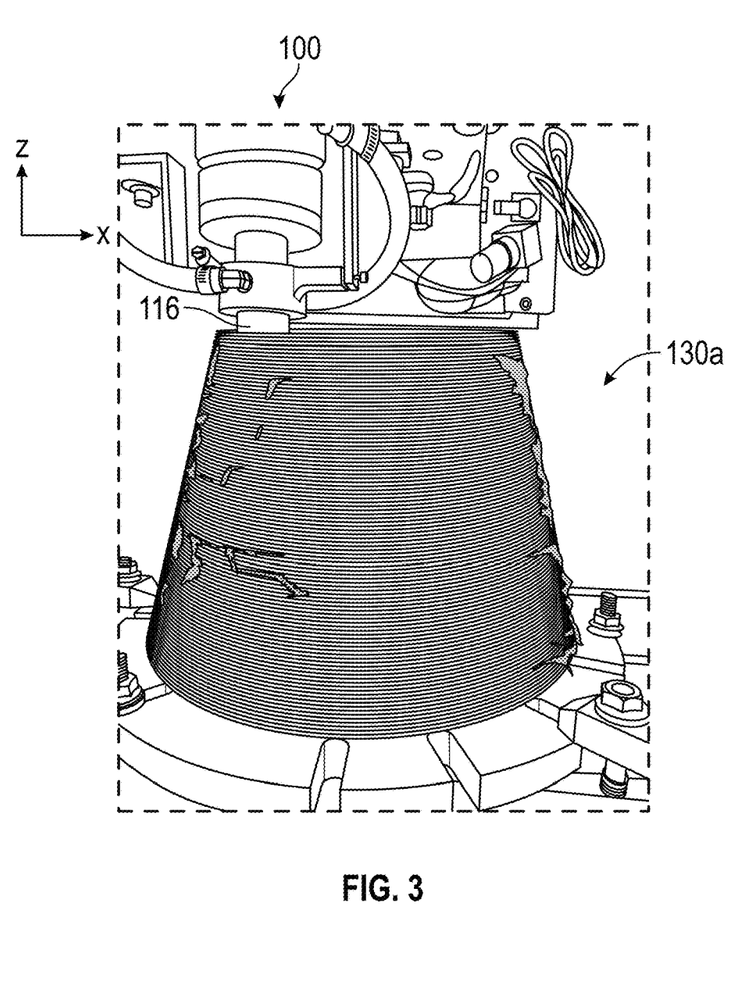
FIG. 3 illustrates a near net shaped part formed using additive manufacturing according to an embodiment of the present disclosure.
Figure 8:
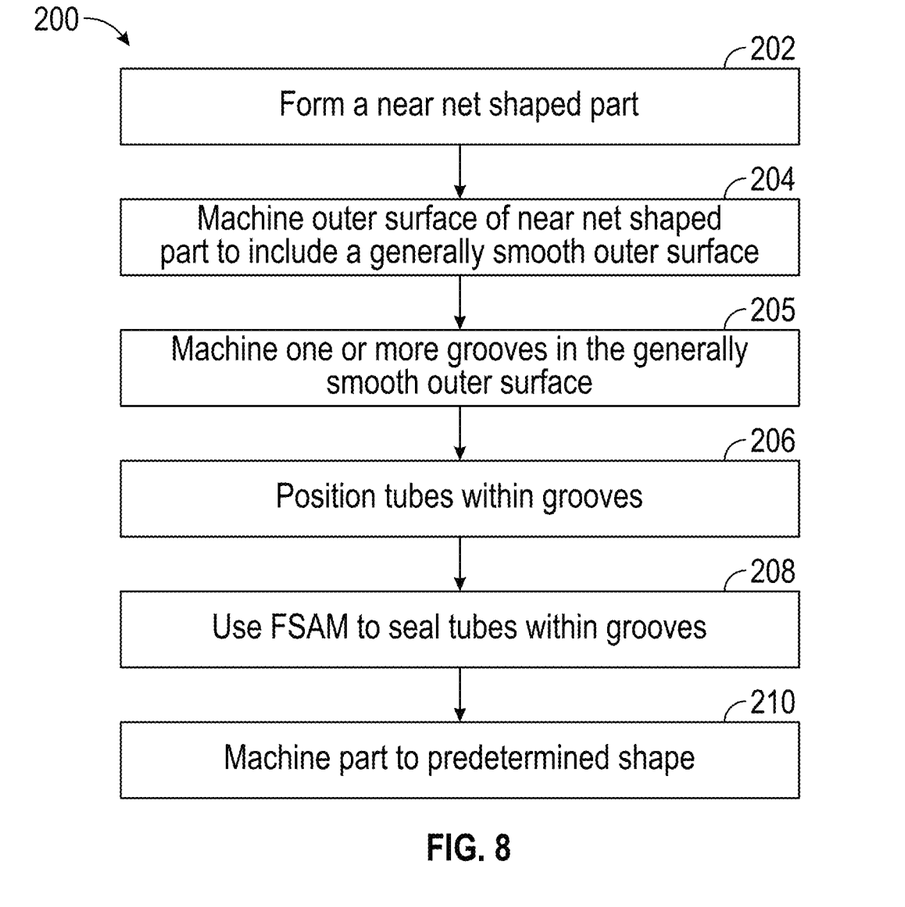
FIGS. 8 and 9 are flow charts representing example methods of forming a part including integrated passages according to an embodiment of the present disclosure.

FIGS. 3-6 illustrate various example stages of a part 130 being formed with integrated/embedded passages using systems and methods according to the present disclosure. FIG. 8 is a corresponding flow chart representing an example method 200 of forming the part 130 according to an embodiment of the present disclosure. With reference to FIG. 3, an initial part 130a can be formed during a first FSAM process using the additive manufacturing tool 100 according to an embodiment of the present disclosure. As described herein, the additive manufacturing tool 100 can have a rotating spindle 116 having a channel 112. The channel 112 can be configured to hold the filler material 104, and the filler material 104 can be deposited as layers of material to form the initial part 130a. The layers of filler material 104 can transition from a softened state to a hardened state to form the base structure of the initial part 130a. Layers of material can be deposited one on top of each other and/or one next to each other. The number of layers deposited can be dependent on various factors, including the part thickness, the part geometry, and the intended location of embedded objects (for example, passages).

The motion of the rotating spindle 116 and the shape of the layers being deposited can be determined by the intended shape of the initial part 130a. According to an embodiment of the present disclosure, the initial part 130a can have a general cone or nozzle shaped base structure. The rotating spindle 116 can move in the z-axis direction while simultaneously moving in circles of decreasing diameter as it deposits filler material in layers. The deposited material can be arranged in ring-shaped layers surrounding an internal cavity (for example, internal cavity 131 shown in FIG. 6). The internal cavity 131 can form a cavity of a nozzle or combustion chamber. While a cone or nozzle-shaped initial part 130a is depicted, a structure of any predetermined shape can be formed by adjusting the motion of the rotating spindle 116.

The initial part 130a can be formed to have a near net shape. For example, the initial part 130a can be formed to closely resemble the intended final part. The motion of the rotating spindle 116 can move in a predetermined formation that is predetermined to deposit the layers of filler material in a way to closely resemble the intended final part. The formation of the initial part 130a having a near net shape can eliminate unnecessary manufacturing steps. This formation of the initial part 130a is represented by block 202 in FIG. 8.

Figure 4:
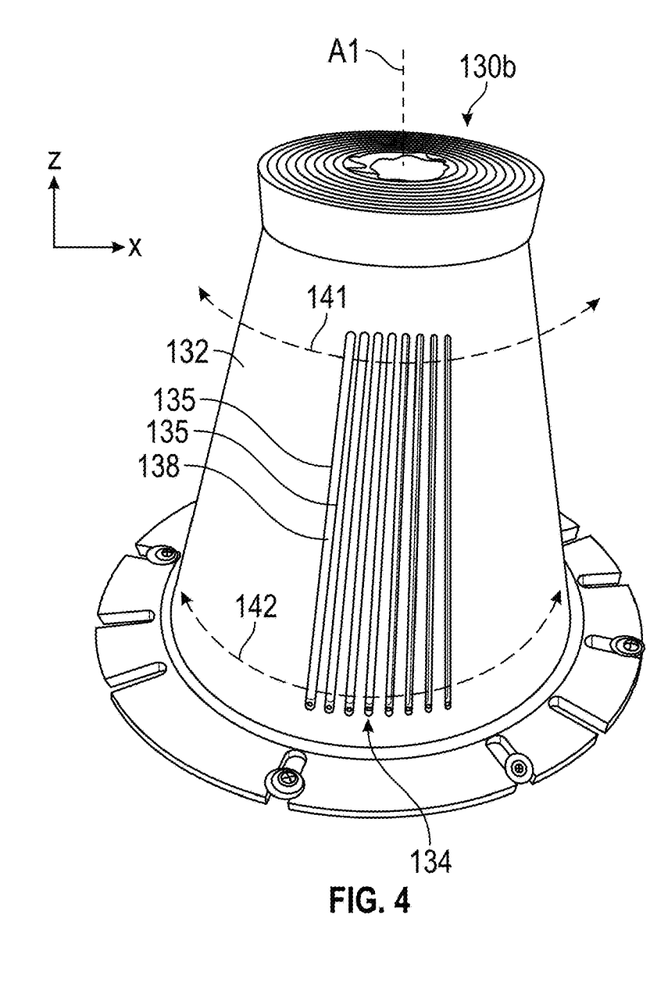
FIG. 4 illustrates the part of FIG. 3 after being machined to have a plurality of grooves according to an embodiment of the present disclosure.

Moving to FIG. 4 and block 204 of FIG. 8, an outer surface of the initial part 130a can be machined during a first machining process to form a machined part 130b according to an embodiment of the present disclosure. The machined part 130b can generally resemble the initial part 130a in size and shape. The outer surface(s) of the machined part 130b can be machined to have a generally smooth outer surface 132. The inner surface(s) (for example, inner surface 133 shown in FIG. 6) of the machined part 130b can be machined to have a generally smooth inner surface.

Moving to block 205, the generally smooth outer surface 132 of the machined part 130b can be machined during a second machining process to form one or more grooves or channels 134 in the generally smooth outer surface 132. The generally smooth outer surface 132 can be curved. The one or more grooves 134 can extend into the generally smooth outer surface 132 of the machined part 130b. Alternatively, in some instances the one or more grooves 134 can be machined prior to the outer surface of the initial part 130a being machined.

The number of grooves 134 can be dependent on the intended number of integrated passages in the final part. While 8 grooves 134 are depicted, there could be more than 8 grooves 134, less than 8 grooves 134, or 8 grooves 134. The one or more grooves 134 can be arranged in a predetermined section of the generally smooth surface 132. The one or more grooves 134 can be arranged around the entire circumference of the machined part 130b. The one or more grooves 134 can extend an entire length or width of the generally smooth surface 132, or the one or more grooves 132 can have a predetermined length or width that is less than the corresponding length or width of the generally smooth surface 132. The predetermined length or width of each of a plurality of the grooves 134 can be the same or different. The one or more grooves 134 can be formed in a curved surface, a planar surface, or a surface having a combination of curved and planar features. The one or more grooves 134 can be formed in a surface that slants inward toward a central axis A1 of the machined part 130b as the surface extends from a bottom to a top of the machined part in the z-axis direction. The distance between adjacent grooves 134 can change along the z-axis direction. The distance between adjacent grooves 134 can remain generally constant along the z-axis direction. The grooves 134 can all extend in the same general direction. The grooves 134 can be positioned generally parallel to each adjacent groove 134. The grooves 134 can extend varying directions. Each groove 134 can have a constant depth along the groove 134 or a depth that varies along the groove 134. Each of a plurality of the grooves 134 can have the same depth but other configurations can be implanted. The grooves 134 can extend in a generally linear path but other configurations can be implanted, for example, the grooves 134 can have portions that are non-linear or turn in different directions. For example, in one non-limiting example, the groove 134 can follow a curved path. Each groove 134 can have sidewalls 135 extending the length of the groove 134 that are substantially parallel. The grooves 134 can be oriented such that no two grooves 134 intersect but other configurations can be implemented.

Figure 7:
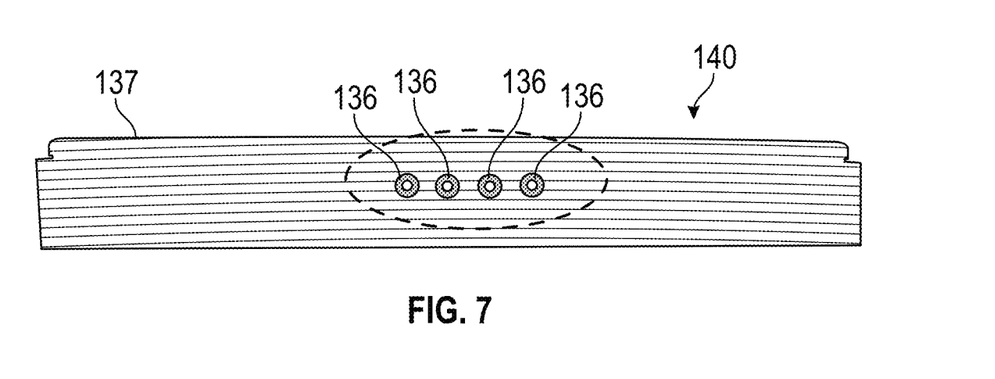
FIG. 7 is a cross-sectional view of a plurality of integrated passages in a part according to an embodiment of the present disclosure.

The one or more grooves 134 can be configured to receive corresponding tubes 136 (not shown in FIG. 4, but an example is shown in FIG. 7 discussed below). The tubes 136 can be positioned into the grooves 134, as represented by block 206 of FIG. 8. The tubes 136 can be positioned one at a time, or a plurality of tubes 136 can be positioned simultaneously. The tubes 136 can be positioned manually or in an automated manner. The tubes 136 can be hollow to define a passage, channel, or other enclosed/hollow structure 136. The passages or channels formed by the tubes or other hollow structures 136 can be configured to transport a liquid, such as but not limited to a coolant, such as but not limited to a fuel. Tubes 136 can have any suitable cross-sectional shape. For example, a tube 136 can have a rectangular cross-section. In one non-limiting embodiment of a rectangular tube 136, the tube has inner dimensions of about 0.08 inches by 0.2 inches and an inner cross-sectional area of about 0.016 in². In another example, a tube 136 has a circular cross-section. In one non-limiting embodiment of a circular tube 136, the tube has an inner radius of about 0.07 inches and a cross-sectional area of about 0.015 in². Cross-sectional shapes and dimensions of grooves 134 can be selected such that the grooves 134 are configured to receive tubes 136 having particular cross-sectional shapes and dimensions.

The tubes 136 can be formed of any suitable material, such as but not limited to a metal. The tubes 136 can be formed of and/or include the same material of the initial part 130a, or the tubes 136 can be formed of and/or include a material that is different than the material of the initial part 130a.

Embodiments of the present disclosure are not limited to receiving hollow structures in the grooves 134. In some non-limiting examples, non-hollow structures are received in the grooves 134. For instance, solid structures, such as solid wires, can be received in the grooves 134. The wires can be formed of aluminum or any other suitable material. The wires can be placed in grooves 134 and secured in the grooves 134 using FSAM in accordance with embodiments of the present disclosure. In some cases, after the wires are secured in the grooves 134 using FSAM, the wires are removed from the final part. For example, the wires may be removed from the grooves 134 using chemical and/or thermal processes after a layer or layers of FSAM material is placed over the wires. In instances where the wires are removed, removal of the wires can form passages, channels, or voids within the final part. The passages, channels, or voids can have cross-sectional shapes and dimensions corresponding to the cross-sectional shapes and dimensions of the wires before the wires were removed.

Figure 6:
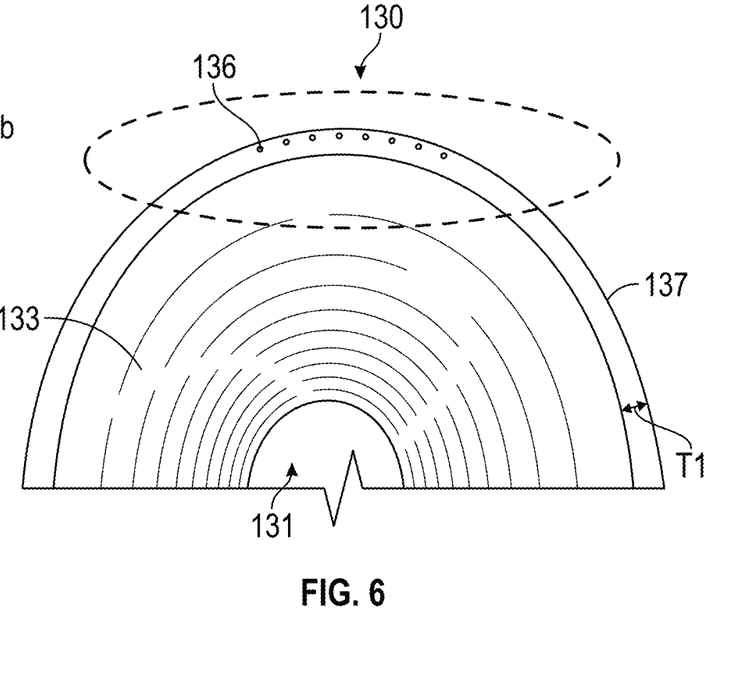
FIG. 6 illustrates a bottom view of the part of FIGS. 3-5 after the exterior surface of the part has been machined according to an embodiment of the present disclosure.

The passages formed by the tubes 136, as shown in FIG. 6, are integrated into a curved final part. The grooves 134 can be sized and shaped depending on the size and shape of the tubes 136 that form the passages in the final part. The grooves 134 can extend a predetermined depth into the machined part 130b. The depth that each groove 134 extends into the outer surface 132 can be the same or different. For example, the intended positioning of the tubes 136 can vary depending on the purpose and design parameters of the final part. In one non-limiting embodiment, one or more tubes 136 can be positioned in a first set of grooves 134 extending into the outer surface 132 at a first depth, and one or more tubes 136 can be positioned in a second set of grooves 134 extending into the outer surface 132 at a second depth different than the first depth. In some instances, all tubes of a plurality of tubes 136 can be positioned in grooves 134 that extend into the outer surface 132 at the same depth.

The path of the grooves 134 can depend on a number of factors, for example, the shape of the machined part 130b and the intended pathway for the passages formed by the tubes 136. For example, in the example of FIG. 4 in which grooves are formed on the surface of a conical-shaped part 130b, the grooves 134 follow a substantially linear path that slants towards axis A1 as the groove extends from a bottom of the groove to a top of the groove along the z-axis direction (for example, the grooves 134 follow a substantially linear path in a z-y plane extending into the page of FIG. 4). In some instances, the grooves follow a non-linear path that curves to follow a curved surface in the part 130b (for example, the grooves 134 follow a curved path in an x-y plane through part 130b (not shown in FIG. 4)). In addition, the cross-sectional profile of the grooves 134 can take any suitable form, including but not limited to a semi-circular or square cross-sectional profile. In the non-limiting embodiment illustrated in FIG. 4, the grooves 134 have a semi-circular profile with a rounded bottom surface 138 and curved sidewalls 135. The grooves 134 illustrated in FIG. 4 are configured to receive a cylindrical tube 136. In another non-limiting embodiment, the grooves 134 can have a square cross-sectional profile with a substantially planar bottom surface 138 and substantially planar sidewalls 135. Such grooves 134 can be configured to receive a tube 136 having a square cross-sectional profile. It will be understood that grooves 134 having any suitable shape, size, and/or cross-sectional profile can be implemented in the embodiments of the present disclosure.

Figure 5:
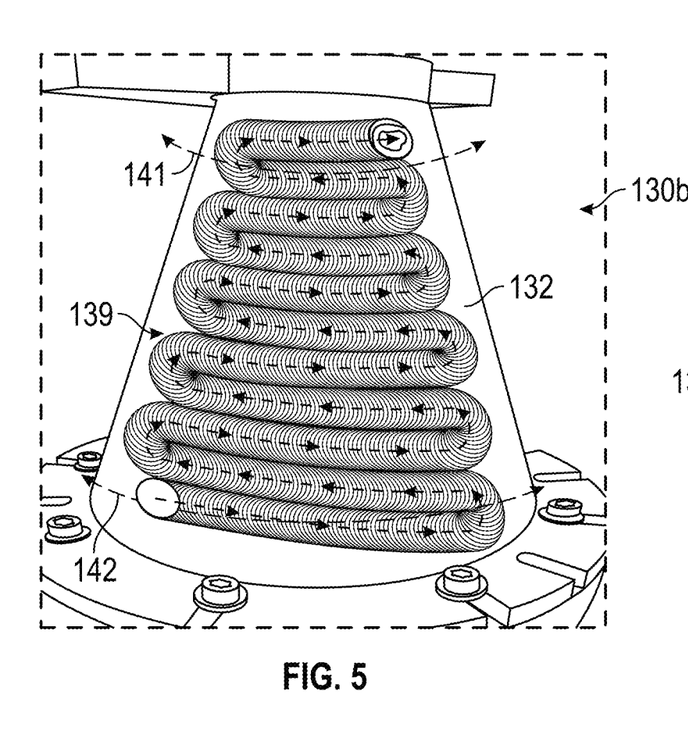
FIG. 5 illustrates the part of FIG. 4 after a layer of material has been deposited over the plurality of grooves according to an embodiment of the present disclosure.

Moving to FIG. 5 and block 208 of FIG. 8, additional material 139 can be deposited over the tubes 136 using a second FSAM process according to an embodiment of the present disclosure. The additional material 139 can include one or more additional layers of material being deposited over the machined part 130b with the tubes 136 positioned in the grooves 134. The additional material 139 can secure and/or seal the tubes 136 within the grooves 134 when the material hardens. The filler material 104 being applied over the grooves 134 can fill in any portions of the grooves 134 that are not filled by the tubes 136. The filler material 104 can fill the grooves 134 such that the tubes 136 are secured in place in the grooves 134 and do not move within the grooves 134. The additional material 139 can be deposited on a portion of a surface of the machined part 130b or over the entire surface of the machined part 130b. The number of additional layers deposited can be dependent on the intended characteristics of the final part, for example, the final part thickness, the final part geometry, and the intended location of embedded objects (for example, passages formed by tubes 136).

Moving to FIG. 6 and block 210 of FIG. 8, the part 130b can be machined to a predetermined final shape according to an embodiment of the present disclosure. The additional material 139 deposited over the tubes 136 can be machined to a predetermined shape. The additional material 139 deposited as shown in FIG. 5 can be machined to form a generally smooth exterior surface 137. FIG. 6 illustrates a bottom view of the final part 130 after the exterior surface 137 of the part 130b has been machined according to an embodiment of the present disclosure. The final part 130 can have an internal cavity 131 defined by an internal surface 133 of the base structure that is composed of layers deposited in the first FSAM process and was machined to form a smooth internal surface 133 in the first machining process. The thickness T1 of the final part 130 can be determined in part by how many layers of material were deposited during the FSAM processes, and the extent to which the part 130a and the part 130b were machined during the first and second machining process, respectively. The thickness T1 can be constant but other configurations can be implemented.

FIG. 7 illustrates another non-limiting embodiment of passages formed by tubes 136 embedded/integrated into a part or structure according to the present disclosure. FIG. 7 is a partial cross-section of integrated passages formed by tubes 136 of a part 140 after an exterior surface 137 of the part has been machined in a second machining process according to an embodiment of the present disclosure. In contrast to the embodiment of FIGS. 3-6 having passages formed by tubes 136 embedded/integrated within curved walls of a conical-shaped base structure, passages formed by tubes 136 are embedded/integrated into a substantially planar base structure in FIG. 7. In accordance with embodiments of the present disclosure described above, the tubes 136 are sealed in place to form integral/embedded passages formed by tubes 136 within the part 140. For example, the passages formed by tubes 136 are substantially enclosed between an exterior surface 137 and an internal surface 133 of the part 140. For another example, the passages formed by tubes 136 are substantially bounded by the exterior surface 137 and the internal surface 133 of the part 130. The additional material deposited in a second FSAM process (for example, additional material described above with reference to FIG. 5) can fill and surround grooves 134 machined into the part (for example, as described above with reference to FIG. 4). When the additional layers of material transition from a softened state to a hardened state, the additional layers of material deposited in the second FSAM process and the initial layers of material deposited in the first FSAM process can become fused or joined to form a single integral part around the passages formed by tubes 136. For example, as shown in FIG. 7, there is no break or noticeable discontinuation between the initial layers of material deposited in the first FSAM process and the additional layers of material deposited in the second FSAM process. The tubes 136 can be a material that is different than the material of the part 130. As such, embodiments of parts 130 with integrated passageways according to the present disclosure can advantageously integrate dissimilar materials into the final part.

After the exterior surface 137 of the final part 130 has been machined to form the generally smooth surface, the part 130 can be further processed to expose an entrance and an exit of the tubes 136 which were embedded/integrated within the final part 130. In one example further processing step, the part 130 is cut along a plane indicated by lines 141 and 142, as shown in FIGS. 4 and 5, thereby forming and/or exposing an entrance and an exit to each tube 136. Example entrances/exits of the passages formed by tubes 136 are illustrated in FIG. 6. In some embodiments, the grooves 134 and/or tubes 136 can terminate into a common channel or manifold at one or both ends of the grooves 134 and tubes 136. The common channel or manifold can function as a single entrance and/or exit. In some embodiments the grooves 134 and/or tubes 136 can be connected to a chamber embedded in the part 130 or welded to the part 130.

Figure 9:
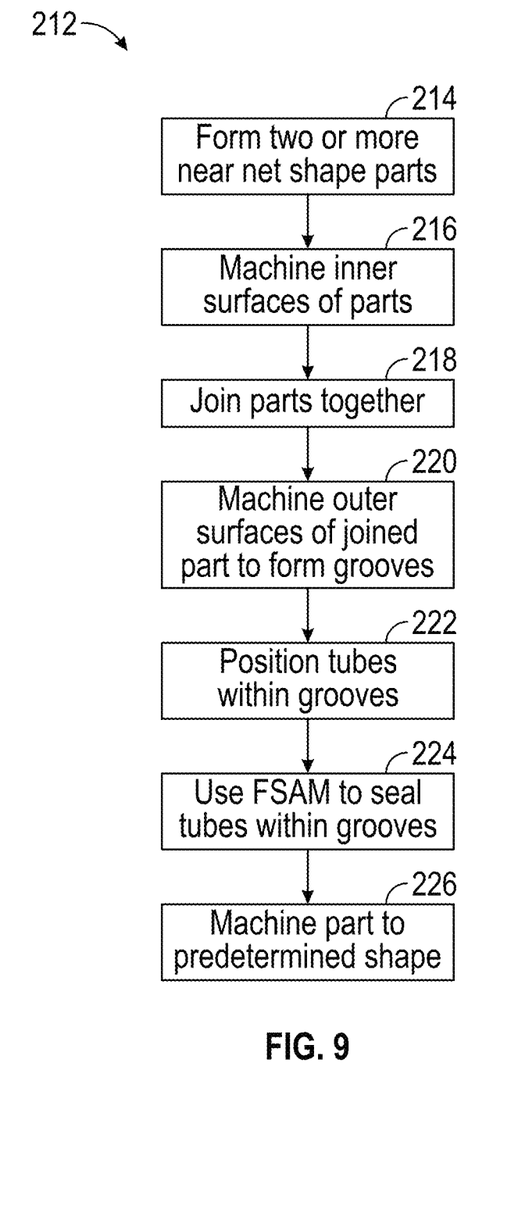
Figure 10:
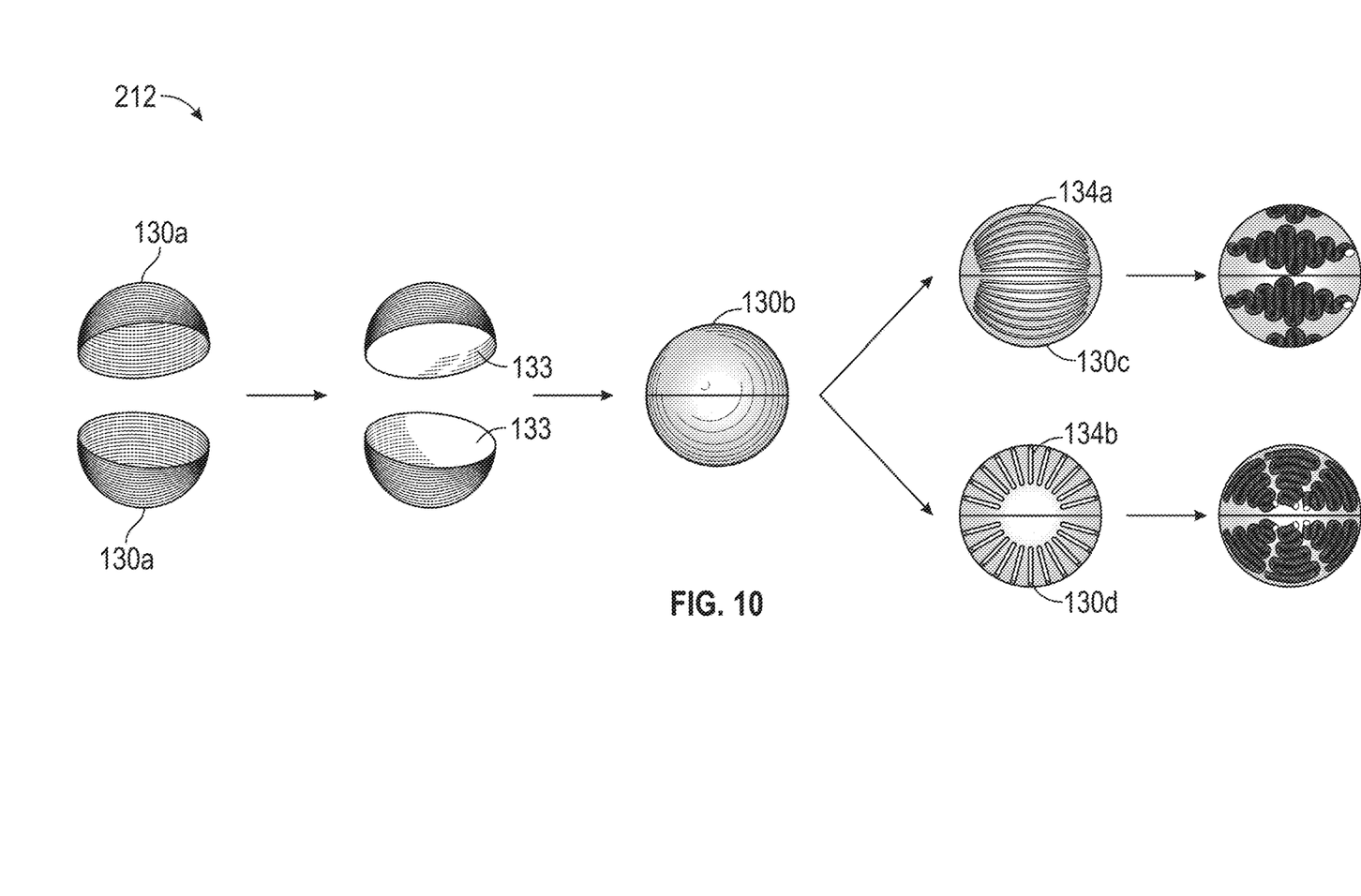
FIG. 10 illustrates an example method of forming a structure including integrated passages by joining two initial parts according to an embodiment of the present disclosure.

FIG. 9 is a flow chart representing another example method 212 of forming a part having integrated passages according to an embodiment of the present disclosure. FIG. 10 schematically illustrates the method 212 according to a non-limiting embodiment of the present disclosure. It will be understood that the method 212 can be implemented in many other suitable ways, resulting in other intermediate and final parts than those illustrated in the examples illustrated in FIG. 10. Starting at block 214, two or more initial parts (for example, initial part 130*a*) are formed. The two or more initial parts can be formed using any suitable manufacturing technique, for example an additive manufacturing technique, for example an FSAM technique. The two or more parts can be formed to have a near net shape using any of the processes described herein. The two or more parts can have any shape or geometry. For example, the parts can have curved surfaces and/or substantially planar surfaces. The number of initial parts being formed can be dependent upon the intended shape of the final part.

Moving to block 216, inner surfaces (for example, inner surfaces 133) of the two or more initial parts are machined. The inner surfaces can be machined to have a generally smooth surface. Moving to block 218, after machining the inner surfaces of the two or more parts, the two or more parts can be joined together forming a joined part or structure 130*b*. Example methods of joining the two or more parts include welding, gluing, melting, and fastening.

Moving to block 220, once the joined part 130*b* is formed, the outer surface of the joined part 130*b* can be machined, for example, similar to the processes described with reference to FIG. 4 and FIG. 8 above. The joined part or structure 130*b* can be machined to have a generally smooth outer surface. The joined part or structure can be machined to include one or more grooves (for example, grooves 134) in the outer surface. The one or more grooves can be machined into the generally smooth outer surface, or the one or more grooves can be machined into the outer surface prior to machining the joined part or structure 130*b* to have a generally smooth outer surface. The one or more grooves can be machined in a predetermined orientation. The one or more grooves can be formed in a portion of the joined part or structure or extend over an entire surface of the joined part or structure. For example, as shown in FIG. 10, a portion of the joined part or structure may have grooves, or substantially the entire surface of the joined part or structure may have grooves. Additionally, the grooves may extend in different directions relative to the orientation of the joined part or structure. For example, as illustrated in FIG. 10, the grooves 134 can include grooves 134*a* extending as shown in the part 130*c*. In another non-limiting example, the grooves 134 can include grooves 134*b* extending in an alternate way, as shown in the part 130*d*.

Moving to blocks 222, 224, and 226, tubes (for example, tubes 136) can be positioned within the grooves (for example, grooves 134*a* in the part 130*c* or grooves 134*b* in the part 130*d*). The tubes can be positioned one at a time, or a plurality of tubes can be positioned simultaneously. The tubes can be positioned manually or in an automated manner. The tubes can then be sealed within the grooves using FSAM in accordance with embodiments of the present disclosure. The part 130*b* can then be machined to a predetermined final shape, as described above in accordance with embodiments of the present disclosure. In one non-limiting embodiment illustrated in FIG. 10, the final part is a spherical tank with embedded tubes.

The methods and structures according to the present disclosure can provide various advantages and benefits. They can allow for the formation of a final structure having a more complex design, while still integrating internal passages. This can reduce the overall thickness of the final structure as the passages will no longer need to be mounted external to the final structure. The integrated internal passages can reduce the overall weight of the final structure as the thickness of the internal tubing can be thinner because the surrounding structure provides additional protection to the tubes. The integration of the passages can also eliminate or reduce the fragile nature of the tubing by providing the additional protection. Further, the methods and structures can eliminate the potential for the tubing to become delaminated to the surface of a structure (for example, a tank). The functioning of the internal passageways can also result in higher efficiencies as the tubing and the overall shape of the structure can be uniform. Further, the heat transfer efficiencies can have improved predictability as the tubing can be in full contact with the wall of the structure (for example, a tank) instead of only making contact on one side. The lack of a bonding material can also improve the predictability of the heat transfer efficiencies.

While the above detailed description has shown, described, and pointed out novel features of the present disclosure as applied to various embodiments, it will be understood that various omissions, substitutions, and changes in the form and details of the device or process illustrated may be made by those skilled in the art without departing from the spirit of the present disclosure. As will be recognized, the present disclosure may be embodied within a form that does not provide all of the features and benefits set forth herein, as some features may be used or practiced separately from others. All changes which come within the meaning and range of equivalency of the claims are to be embraced within their scope.

The term "comprising" as used herein is synonymous with "including," "containing," or "characterized by," and is inclusive or open-ended and does not exclude additional, unrecited elements or method steps. With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches. For example, terms such as about, approximately, substantially, and the like may represent a percentage relative deviation, in various embodiments, of +1%, +5%, +10%, or +20%.

The above description discloses several methods and materials of the present disclosure. The present disclosure is susceptible to modifications in the methods and materials, as well as alterations in the fabrication methods and equipment. Such modifications will become apparent to those skilled in the art from a consideration of this disclosure. Consequently, it is not intended that the present disclosure be limited to the specific embodiments disclosed herein, but that it covers all modifications and alternatives coming within the true scope and spirit of the present disclosure.

What is claimed is:

1. A method of additive manufacturing a part comprising:
    forming a first part and a second part separate from the first part, each part having a near net shape, the first part and the second part formed by moving a friction stir tool configured to deposit a filler material;
    machining an inner surface of each part;
    joining the first part and the second part to form a structure, the inner surfaces of the first part and the second part configured to define an interior space of the structure;
    machining an outer surface of the structure;
    machining a plurality of grooves extending into the outer surface of the structure, the plurality of grooves sized to each receive a tube;
    placing a tube into each of the plurality of grooves;
    depositing a layer of material configured to secure the tubes within the plurality of grooves by moving the friction stir tool across the outer surface of the structure; and
    machining the outer surface of the structure to form a predetermined shape.

2. The method of claim 1, wherein the first part and the second part are hemispheres.

3. The method of claim 1, wherein the tubes are configured to transport a liquid for heat exchange.

4. The method of claim 1, wherein the structure has a cylindrical shape.

5. The method of claim 1, wherein the structure is a tank.

6. The method of claim 1, wherein joining the first part and the second part comprises at least one of welding, gluing, melting, and fastening the first part and the second part to form the structure.

7. The method of claim 1, wherein the friction stir tool comprises a spindle having a channel extending along a central axis of the spindle and configured to hold the filler material, and wherein forming a first part and a second part comprises rotating the spindle of the friction stir tool to deposit the filler material held in the channel.

8. A method of additive manufacturing a part comprising:
forming a first part having a near net shape and a second part having a near net shape, by depositing layers of material using a friction stir tool, a new layer added to a surface of a previously deposited layer;
joining the first part and the second part to form a structure, an inner surface of the first part and an inner surface of the second part configured to define an interior space of the structure;
machining a plurality of grooves extending into an outer surface of the structure, the plurality of grooves sized to each receive a wire;
positioning a wire into each of the plurality of grooves;
securing the wires within the plurality of grooves with additional material deposited over the wires; and
machining the outer surface of the structure to form a predetermined shape.

9. The method of claim 8, further comprising machining the inner surface of the first part and the inner surface of the second part.

10. The method of claim 8, wherein the first part and the second part are hemispheres.

11. The method of claim 8, wherein the structure has a cylindrical shape.

12. The method of claim 8, wherein the structure is a tank and the interior space is configured to hold a gas or a liquid.

13. The method of claim 8, wherein the wires comprise hollow wires.

14. The method of claim 13, wherein the hollow wires are configured to transport a gas or a liquid for heat exchange.

15. The method of claim 8, wherein the wires comprise solid wires.

16. The method of claim 15, wherein the wires comprise solid aluminum wires.

17. The method of claim 15, further comprising removing the solid wires from the predetermined shape using a chemical or thermal process.

18. The method of claim 8, wherein the material is a first material and the wires are formed of a second material different than the first material.

19. The method of claim 8, wherein the material is a first material and the wires are formed of a second material that is the same as or substantially the same as the first material.

20. The method of claim 8, wherein joining the first part and the second part comprises at least one of welding, gluing, melting, and fastening the first part and the second part to form the structure.

* * * * *